United States Patent [19]

Lindstrom

[11] Patent Number: 4,549,945

[45] Date of Patent: Oct. 29, 1985

[54] UV CURED POLYURETHANES USING ORGANOTIN PROMOTERS

[75] Inventor: Merlin R. Lindstrom, Bartlesville, Okla.

[73] Assignee: Phillips Petroleum Company, Bartlesville, Okla.

[21] Appl. No.: 569,812

[22] Filed: Jan. 11, 1984

[51] Int. Cl.[4] .......................... C08F 2/50; C08G 18/24
[52] U.S. Cl. ................................ 204/159.11; 521/126; 204/159.14; 525/123; 528/58; 528/75
[58] Field of Search ...................... 204/159.11, 159.19, 204/159.14; 525/123; 528/58, 85

[56] References Cited

U.S. PATENT DOCUMENTS

| | | | |
|---|---|---|---|
| 3,523,103 | 8/1970 | Zemlin ................................... | 528/58 |
| 3,552,961 | 1/1971 | Notley et al. ........................ | 430/152 |
| 4,119,510 | 10/1978 | Williams . | |
| 4,186,017 | 1/1980 | Palmer ................................ | 430/175 |
| 4,333,987 | 6/1982 | Kwart ............................. | 204/159.16 |
| 4,424,252 | 1/1984 | Nativi ............................. | 204/159.19 |

FOREIGN PATENT DOCUMENTS 975456 11/1964 United Kingdom ................ 430/152
975457 11/1964 United Kingdom ................ 430/152

OTHER PUBLICATIONS

Steinert et al., "The Photo Chemistry of . . . Hexaphenylditin", Journal of Organometallic Chemistry, 24, (1970), 113–118.

App. Ser. No. 558,650, filed 12-6-83.

J. Organometal. Chem. I, (1964), 434–436, Farrar et al.

Primary Examiner—John C. Bleutge
Assistant Examiner—Arthur H. Koeckert

[57] ABSTRACT

A photocurable composition consisting essentially of the mixture of a diisocyanate compound, a polyol and certain UV light sensitive organotin compounds. The photocurable composition is cured by exposing it to ultraviolet light in the wavelength range of 2000 to 4000 Angstroms for a period of about 0.1 second to about 20 minutes at a temperature in the range of about 0° F. to about 180° F.

8 Claims, No Drawings

UV CURED POLYURETHANES USING ORGANOTIN PROMOTERS

The reaction of diisocyanates and polyols to form polyurethane compounds is well known. Furthermore, the addition of such reaction promoters as dibutyltin dilaurate and certain tertiary amines to the urethane reaction mixture is also known. The disadvantage of using these reaction promoters, though, is that they promote almost instantaneous curing of the urethane which is not always desirable especially when the urethane is to be applied as a coating. Instead, it may be more desirable to use a more latent reaction promoter which is not activated until exposed to ultraviolet light.

This invention relates to a photocurable liquid composition. It also relates to a process for curing polyurethanes employing a photocurable liquid composition.

Other aspects, objects, and advantages of the present invention are apparent from the specification and claims.

In accordance with the present invention I have discovered that the addition of certain organotin compounds to a mixture of a diisocyanate and a polyol provides for a photocurable composition which when exposed to ultraviolet light effects the rapid curing of polyurethanes. In this manner, curing is not achieved until the reaction mixture is exposed to ultraviolet light in an amount sufficient to affect activation of the UV light sensitive organotin compound. This contrasts sharply with the situation wherein undesired instantaneous curing is achieved with the addition of certain compounds which are not UV light sensitive, such as dibutyltin dilaurate, to the reaction mixture.

The photocurable composition of this invention is formed by the process of mixing together a diisocyanate compound, a polyol, and a UV light-sensitive organotin compound.

The diisocyanate compounds useful in the present invention are those represented by the formula OC—N—R''—NCO wherein R'' is a $C_4$ to $C_{12}$ alkylene, arylene, alkarylene, or aralkylene radical, preferably alkylene.

Exemplary of such diisocyanate compounds include hexamethylene diisocyanate, 2,4-toluene diisocyanate, 2,6-toluene diisocyanate, polymethylene polyphenyl isocyanate, and mixtures thereof. Presently preferred are hexamethylene diisocyanate and 2,4-toluene diisocyanate or a mixture of 2,4- and 2,6-toluene diisocyanate.

Additionally, any suitable polyol may be used in the present invention as well. Exemplary of such polyols are trimethylolpropane, 1,4,6-hexanetriol and propylene oxide and mixtures thereof and hydroxy-containing copolymers such as those prepared from the copolymerization of styrene and allyl alcohol.

The UV light sensitive organotin compounds useful in the present invention are those represented by the formulae:

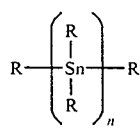 (I)

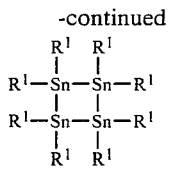 (II)

wherein R represents branched $C_3$ to $C_{10}$ alkyl, cycloalkyl, or aryl radical with the proviso that at least one R is aryl, $R^1$ represents a branched $C_3$ to $C_{10}$ alkyl, cycloalkyl, or aryl radical, and n is 2, 3, or 4.

Examples of organotin compounds falling under Formula I are:
pentaisopropylphenylditin
penta-tert-butylphenylditin
penta(1,1-dimethylbutyl)phenylditin
tetra-tert-butyldiphenylditin
tetraphenyldi-tert-butylditin
hexaphenylditin
octaphenyltritin
decaphenyltetratin
triphenyltri-tert-butylditin, and mixtures thereof.
Preferred is hexaphenylditin.

Examples of organotin compounds falling under Formula II are:
octa(isopropyl)tetrastannacyclobutane
octa(isobutyl)tetrastannacyclobutane
octa(tert-butyl)tetrastannacyclobutane
octa(phenyl)tetrastannacyclobutane
tetra(tert-butyl)tetra(phenyl)tetrastannacyclobutane
octa(triphenylmethyl)tetrastannacyclobutane
octa(cyclohexyl)tetrastannacyclobutane, and
mixtures thereof. Preferred is octa(tert-butyl)tetrastannacyclobutane.

In the present invention, the amount of UV light sensitive organotin compound employed is generally about 0.1 to 5 weight percent, preferably 0.3 to 3.0, based on the total weight of the diisocyanate/polyol/UV light sensitive organotin compound mixture.

Generally, the ratio of diisocyanate to polyol employed is about 1:1 to 1:1.2 based on the equivalent weights of the two compounds.

After thorough mixing of the above ingredients, the resulting photocurable composition is ready for use. If desired, any unreacted or excess material may be removed.

In another embodiment of this invention, the photocurable compositions are cured by exposure to ultraviolet light, generally in the wavelength of 2000 to 4000 Angstroms. Such light is available from sunlight and from many different commercial lamps including mercury vapor lamps, UV fluorescent lamps, and the like.

Conditions of exposure to ultraviolet light under which the desired cured product is obtained are generally exposure of about 0.1 second to about 20 minutes at a temperature in the range of about 0° F. to about 180° F., preferably 1 minute to 5 minutes at a temperature in the range of 75° F. to 140° F. It may sometimes be desirable to provide an inert atmosphere during the curing step.

The cured compounds of this invention are useful as resins in both the paint and ink industries.

The following examples further illustrate the present invention.

EXAMPLE I

This example illustrates the use of tetrastanna cyclobutanes as light sensitive curing catalysts for isocyanate/polyol reactions.

To a beaker was added 10.0 grams of a styrene/allyl alcohol copolymer (RJ-100, available from Monsanto and having an equivalent weight of 300 and a hydroxy content of 5.7 weight percent where the hydroxy number was 187.77 milligrams KOH per gram of resin), 8.86 grams of a polyisocyanate (Desmodur N from Mobay Chemical Company, the reaction product of 3 moles of hexamethylene diisocyanate and 1 mole of water), 25 grams of solvent (3 parts Cellosolve acetate plus 1 part toluene) and 0.09 gram of a tin catalyst and the mixture was stirred for a few seconds to thoroughly mix.

A portion of the mixture was poured onto the surface of a precleaned 3 inch×5 inch tin-plated metal panel and evenly spread to a wet thickness of 6 mil by means of a Bird applicator. After allowing the coated panel to stand at ambient room temperature for 15 minutes it was then baked at 175° F. (79° C.) for 15 minutes. The coated panel was then subjected to UV light for 2 minutes (4 inch 200 watt per inch medium pressure mercury lamp, Englehard-Hanovia, Inc.). The pencil hardness of the coating was then measured.

The process was conducted with two tin-based catalysts and without a tin catalyst. In addition to the coatings, the working life or shelf stability of the solutions were also determined by visually observing the pourability of the mixtures before coating and after standing at room temperature for several hours.

The results listed in Table I show that cyclic tin compounds such as octa-tert-butyltetrastannacyclobutane increases the working life of the mixture by preventing gel formation. A similar but linear tin compound, dibutyltin dilaurate, does not give the increased gel time. In addition, the coating having the cyclic tin catalyst compound present does not give a full cure unless exposed to ultraviolet light radiation whereas the coating having the linear tin catalyst compound present cures with or without ultraviolet exposure. (The octa-tert-butyltetrastannacyclobutane catalyst was prepared according to a general procedure described for the compound in *Journal of Organometallic Chemistry*, 1964, pp 434–436.)

TABLE I

Effect of Tin-Based Catalysts on the Performance Properties of Isocyanate/Polyol-Based Coatings

| Formation: | 10 grams Polyol (Eq. Wt. 300)[a] |
|---|---|
| | 8.8 grams Polyisocyanate[b] |
| | 2.5 grams Solvent[c] |
| | 0.09 gram Tin Catalyst[d] |

| | Tin Catalyst | | |
|---|---|---|---|
| | No Catalyst | Dibutyltin Dilaurate[e] | Octa-tert-Butyltetrastannacyclobutane |
| I. Gelation Time, Hrs., before application and curing | — | 1.5 | 6.5 |
| II. Pencil Hardness of coating on tin-plated steel panels | | | |
| A. No UV Exposure, 15 mins./80° C. | 2B | B | 2B |
| B. UV Exposure, 2 mins./25° C. | — | 3H | 3H |

[a]RJ-100, Styrene/Allyl alcohol copolymer, eq. wt. 300 from Monsanto.
[b]Desmodur N, 3 moles hexamethylene diisocyanate plus 1 mole water from Mobay Chemical Co.
[c]3 Parts by weight Cellosolve Acetate and 1 part toluene.
[d]0.476 Wt. % based on dried coating.
[e]Niax Catalyst D-22, Union Carbide.

EXAMPLE II

This example illustrates the usefulness of hexaphenylditin as a light sensitive curing catalyst for isocyanate/polyol reactions.

To a Waring blender was added 10 grams of a polyol (Desmophen 1100, a polyester hydroxy resin from Mobay Chemical Co. having a 215 hydroxy no.), 13.07 grams of a polyisocyanate Desmodur N-75 (reaction product of 1 mole of hexamethylene diisocyanate plus 1 mole of water, from Mobay Chemical Co.) and 0.4 gram of hexaphenylditin (Alpha Division of Ventron Corp.) and the mixture blended for 1 minute.

A portion of the liquid mixture was poured onto the surface of a precleaned 3 inch×5 inch tin-plated metal panel and evenly spread to a wet thickness of about 2 mil by means of a No. 36 wirewound drawdown bar. The panel was baked for 15 minutes 175° F. (79° C.). The dried film was cooled and the coated panel placed on a moving belt (belt speed 10 feet per minute) which was passed under an ultraviolet light (2–300 watt Hanovia mercury lamps) for about 5 seconds exposure. The panel was repeatedly passed under the lamp for 4 to 6 times. After each pass the pencil hardness of the coating was measured to determine extent of cure. In addition, the degree of cure after each pass was also determined by an alternate method, MEK (methyl ethyl ketone) rub. This test consists of a number of times (rubs) required for a MEK soaked tissue (Kimwipe) to be wiped across the coated surface to remove all of the coating. The pressure applied during the wipe was moderate. The more MEK rubs required, the greater the cure. Also, surface finger tack was determined after each exposure.

These results are listed in Table II where it can be shown that hexaphenylditin catalyzes the reaction of an isocyanate and a polyol when exposed to ultraviolet (UV) radiation. As the number of UV exposure passes increased from 2 to 4 pencil hardness remained constant but the MEK rub test indicated curing still taking place. There was no finger tack after 2 passes. In the absnece of UV radiation, the mixture slowly increases in viscosity overnight but does not gel indicating a slow cure process. When the ditin catalyst compound is omitted from the polyol/isocyanate mixture, no cure is obtained even when exposed to UV radiation after 4 passes.

TABLE II

Effect of Hexaphenylditin on a Polyol/Isocyanate Reaction

| Formulation: | 10 grams Polyol[a] |
|---|---|
| | 13.07 grams Polyisocyanate[b] |
| | 0.4 gram Hexaphenylditin |

| Catalyst | Passes[c] | Hardness[d] | Req. for 100% Removal | Tack |
|---|---|---|---|---|
| Hexaphenylditin | 0 | — | 1 | wet (fluid) |
| Hexaphenylditin | 1 | B | 7 | none |
| Hexaphenylditin | 2 | HB | 13 | none |
| Hexaphenylditin | 3 | HB | 22 | none |

TABLE II-continued

Effect of Hexaphenylditin on a Polyol/Isocyanate Reaction

| Hexaphenylditin | | | | |
|---|---|---|---|---|
| Hexaphenylditin | 4 | HB | 23 | none |
| None | 0 | — | 1 | wet (fluid) |
| None | 1 | 8B | 1 | very tacky |
| None | 2 | 8B | 1 | tacky |
| None | 3 | 8B | 2 | tacky |
| None | 4 | 8B | 2 | tacky |

[a]Desmophen 1100, a hydroxy polyester resin (215 hydroxyl no.) from Mobay Chemical Co.
[b]Desmodur N-75, reaction product of 1 mole hexamethylene diisocyanate and 1 mole water, from Mobay Chemical Co.
[c]Each pass equal to 5 seconds exposure to UV radiation, Hanovia mercury lamp, 300 watt/inch.
[d]Pencil Hardness goes from 8H (very hard) to H (medium hardness) followed by HB to 8B (very soft).

EXAMPLE III

This example illustrates the sensitivity of highly sterically hindered tin compounds in catalyzing isocyanate/-polyol reactions using, for example, octa(triphenylmethyl)tetrastannacyclobutane.

This product was prepared by the general procedure reported in Example I. Briefly, the method consists of reacting under nitrogen 21 grams magnesium in 200 milliliters of anhydrous ether and a trace of iodine with 293.5 g of triphenylmethyl chloride (Aldrich Chemical Co.). To this mixture was slowly added under $N_2$, 35 grams of $SnCl_4$ followed by 75 milliliters of water, separating the ether layer and evaporating to obtain a waxy product assumed to be di(triphenylmethyl)stannous dichloride.

In a separate reactor the Grignard of triphenylmethyl chloride was prepared from 14 grams of magnesium in 400 milliliters of tetrahydrofuran with a triphenylmethyl chloride. To this reaction product was slowly added in 10 milliliter aliquots the above waxy di(triphenylmethyl)stannous dichloride. A precipitate which formed was filtered washed with dilute HCl, the resulting oil layer separated and cooled to give a solid thought to be the desired octa(triphenylmethyl)tetrastannacyclobutane.

The catalytic activity or sensitivity of this product was tested by adding 0.4 gram of the catalyst to a mixture of 13.07 grams of a polyisocyanate (Desmodur N-75) and 10 grams of a polyol (Desmophen 1100) in a Waring blender in a manner described for mixing in Example II. The composition cured in the blender probably because the highly sterically-hindered tin catalyst thermally decomposed during the exothermic mixing resulting in a new form of tin that was catalytically active.

Reasonable variations and modifications are possible from the foregoing without departing from either the spirit or scope of the present invention.

I claim:

1. A photocurable composition consisting essentially of a mixture of (a) a diisocyanate of the formula OCN—R"—NCO wherein R" is a $C_4$ to $C_{20}$ alkylene, arylene, alkarylene, or aralkylene radical; (b) a polyol; and (c) at least one organotin compound of the formula

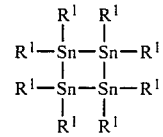

wherein each $R^1$ independently represents a $C_3$ to $C_{10}$ branched alkyl, cycloalkyl, or aryl radical; wherein the amount of said organotin compound is about 0.1 to 5.0 weight percent based on the total weight of the diisocyanate/polyol/organotin reaction mixture and wherein the ratio of said diisocyanate to said polyol is about 1:1 to 1:1.2 based on the equivalent weights of said diisocyanate and said polyol.

2. A composition according to claim 1 wherein said diisocyanate is the reaction product of 3 moles of hexamethylene diisocyanate and 1 mole of water.

3. A composition according to claim 1 wherein said polyol is a copolymer based on styrene and allyl alcohol.

4. A composition according to claim 1 wherein said organotin compound is octa-tert-butyl-tetrastannacyclobutane.

5. A composition according to claim 1 wherein the amount of organotin compound employed is about 0.3 to 3.0 weight percent based on the total weight of the diisocyanate/polyol/organotin reaction mixture.

6. A composition according to claim 1 wherein the ratio of said diisocyanate to said polyol is about 1:1 to 1:1.2 based on the equivalent weights of said diisocyanate and said polyol.

7. A process for the curing of a photocurable composition consisting essentially of a mixture of (a) a diisocyanate of the formula OCN—R"—NCO wherein R" is a $C_4$ to $C_{20}$ alkylene, arylene, alkarylene, or aralkylene radical; (b) a polyol; and (c) at least one organotin compound of the formula

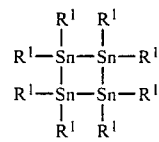

wherein each $R^1$ independently represents a $C_3$ to $C_{10}$ branched alkyl, cycloalkyl, or aryl radical; wherein the amount of said organotin compound is about 0.1 to 5.0 weight percent based on the total weight of the diisocyanate/polyol/organotin reaction mixture and wherein the ratio of said diisocyanate to said polyol is about 1:1 to 1:1.2 based on the equivalent weights of said diisocyanate and said polyol, which comprises exposing said photocurable composition to ultraviolet light in the wavelength range of 2000 to 4000 Angstroms for a period of 0.1 second to about 20 minutes at a temperature in the range of about 0° F. to about 180° F.

8. A process according to claim 7 wherein said organotin compound is octa-tert-butyl-tetrastanna-cyclobutane.

* * * * *